Nov. 7, 1967
A. M. WARN ET AL
3,351,364
LOCKABLE HUB
Filed Oct. 18, 1965
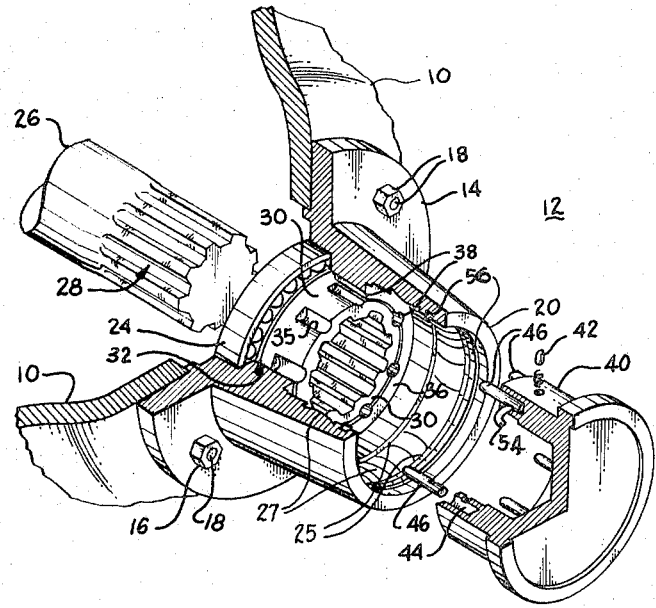
Fig. 1.
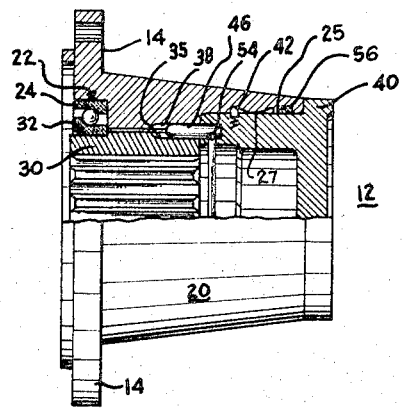
Fig. 2.
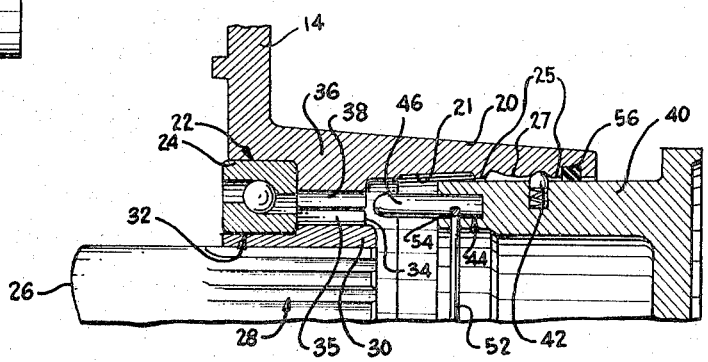
Fig. 3.
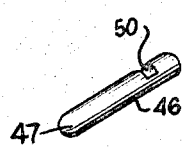
Fig. 4.
INVENTOR.
ARTHUR M. WARN
HARRY J. HEGAR
BY
ATTORNEY

3,351,364
LOCKABLE HUB

Arthur M. Warn, 9050 Empire Way S., Seattle, Wash. 98188, and Harry J. Hegar, 1530 SE. Oxford Lane, Milwaukie, Oreg. 97222
Filed Oct. 18, 1965, Ser. No. 497,093
3 Claims. (Cl. 287—53)

ABSTRACT OF THE DISCLOSURE

A lockable hub for use between a driven shaft and a wheel revolvable thereon, having a push-pull member carrying instanding dowel pins insertable in matching grooves located between the shaft and the hub.

---

This invention relates to a lockable hub and, more particularly, to a hub for use between a driven shaft as of a motor vehicle and a revolvable wheel to selectively lock or unlock the wheel with respect to the shaft.

A typical application of this invention is in the field of automotive vehicles of the front-wheel-drive type. During many periods of use of such a vehicle it is desirable to have the front wheels free to revolve independent of the front-wheel drive shaft. There are occasions when it is desirable to apply power to the front wheel. This device serves to lock the drive shaft to the wheel so that they rotate together when the drive shaft is powered.

The principal object of this invention is to provide a lockable hub manually operable by a simple push-pull action, which has a minimal number of parts thus permitting compactness and ruggedness to the end that the hub is relatively easy to manufacture, requires a low amount of maintenance and is not likely to become inoperative after long periods of nonuse or due to heavy usage.

Broadly stated this lockage hub is for use between a driven front wheel shaft of a motor vehicle and a front wheel associated therewith. It comprises a sleeve coupled to the shaft in a conventional splined manner. The sleeve provides on its exterior surface a bearing surface and an annular series of grooves to be engaged by locking pins that are caused to enter the grooves longitudinally thereof parallel to the axis of the drive shaft. A hub housing is secured to the wheel about the drive shaft at its axis. The hub has an internal bearing means to fit the bearing surface of the sleeve. Interiorally the hub housing closely encircles the sleeve adjacent its grooved portion and is provided with a plurality of grooves matching the grooves of the sleeve however in opposed relation. When an opposed pair of grooves of the sleeve and the hub are substantially aligned a cavity is defined to receive a longitudinally movable dowel member. A series of such dowel members in annular arrangement is carried by a push-pull hub cap which is slidably mounted within an outward tubular extension of the hub housing. The hub cap is manually movable from an outer unlocked position to the inner dowel-engaging, locked position. The degree of movement of the hub cap is limited by detent means operable between the hub cap and the housing to maintain in and out positioning.

In the accompanying drawing has been shown the preferred form of the invention. It will be understood that variations and alterations may be made from the structure shown. All those which fairly fall within the scope of the sub-joined claims are intended to be covered by this patent.

In the drawing:

FIGURE 1 is an exploded view in perspective of a lockable hub according to this invention, portions being omitted for convenience of illustration;

FIGURE 2 is a partially sectional side view, with a portion broken away for illustrative purposes, of the hub of this invention showing the same in the locked position;

FIGURE 3 is a sectional view in side elevation showing the hub in the unlocked position; and FIGURE 4 is a perspective view of one of the locking dowel pins.

Referring to FIGURE 1, wheel 10 is fragmentarily indicated as having a hub, designated as a whole by the numeral 12, secured at its axis at flange 14 by means of conventional nuts 16 and bolts 18. The hub 12 has a tubular extension or housing 20 which outstands from the wheel 10. In the plane of flange 14, housing 20 has a bearing receiving groove 22 in which is fitted a free-rolling bearing 24 here shown as one of the ball and race type. Other types of free rolling bearings may also be used.

Drive shaft 26, splined at 28, is disposed axially within the bearing 24 with sleeve 30 interposed therebetween. This may be best seen in FIGURE 3. Sleeve 30 between its ends is divided into the bearing portion 32 extending for about one-half its length and fitted into bearing 24. For approximately the remaining half of the length of sleeve 30 the same is flanged at 34 and an annular series of longitudinal grooves 35 is provided in the flange 34. Grooves 35 extend parallel to the axis of sleeve 30 and of the shaft 26.

Hub housing 20 likewise has an interior flange 36 provided with a second series of grooves 38 spaced to match the grooves 35 of sleeve 34. Flange 36 extends from the outer end of groove 22, a distance approximately co-equal to the length of the flange 34 on sleeve 30. It will be seen that the two series of grooves 35 and grooves 38 of the sleeve 30 and the housing 20 respectively are disposed in opposed relationship to each other and are matching, there being a like number in each case. Preferably the grooves 35 and 38 are portions of a cylinder. When they are matched in opposition to each other the pairs each define a substantially cylindrical recess.

The interior of hub housing 20 is counter-bored at 21 to an internal diameter greater than the diameter of the flange 36 to provide a hub cap recess. Push-pull hub cap 40 is mounted in and manually moved relative housing 20. The outer surface of cap 40 is cylindrical and at spaced points thereabout is provided with spring-pressed detents 42. Preferably three such detents are employed about the periphery of the cap 40. On its inner circular end cap 40 is provided with a series of recesses 44 which receive dowel pins 46 each of a size and shape to fit into the recess formed by a groove 35 when matched in opposition to a groove 38.

Each dowel pin 46 has a groove or notch 50 near its inner end where it is seated in a recess 44. The inner wall of the hollow hub cap and the series of recesses 44 is cut by an annular groove 52. An outwardly expansible ring 54 is snapped into the groove and into the notches 50 to retain the dowel pins 46 in their respective recesses 44.

The in and out movement of the cap 40 is between the positions illustrated in FIGURES 2 and 3 respectively. Housing 20 has an interior pair of annular ribs 21 between which is convex surface 27 as best seen in FIGURE 3. In the "out" position the detent 42 is disposed just inside of the outermost rib 21. In the "in" position the same detent is disposed just outside of the inner rib 21. In its passage between these two positions the detent flexes inward in its recess in cap 40 and then snaps outward again. This arrangement is suitable to retain the cap either in the "in" or the "out" position. As mentioned before it is preferable that these detents be provided in numbers, three being a suitable choice. They serve as centering devices for the positioning of cap 40 in housing 20. The inner ends 47 of the dowel pins are rounded to facilitate their entry into the matched-groove recesses.

When the operator of a motor vehicle desires that his wheel be free to rotate independent of a front wheel drive shaft 26, the hub cap is pulled to the outer position. Then dowel pins 46 are disengaged from the recesses formed by the matching pairs of opposed grooves in sleeve 30 and in housing 20. Under such circumstances the wheel 10 is free to rotate with respect to the drive shaft sleeve 30. Upon the hub cap 40 being pressed inward to dispose the round-end dowel pins 46 in the matched pairs of opposed grooves 35 and 38 the hub housing 20 is thereby locked to the sleeve 30. Since the latter by means of the splines is locked to the drive shaft 26, the hub housing 20 and the wheel 10 attached thereto will be driven upon power being supplied to the drive shaft 26.

Upon an occasion when an operator wishes to lock his hub to his drive shaft and the grooves 35 and 38 are mismatched it is only necessary to roll or rock the vehicle slightly whereupon it will be found that upon the application of pressure the cap 40 and its dowel pins will easily move longitudinally inward to the locking position. An oil and dirt seal between the housing 20 and the cap 40 is indicated at 56.

What is claimed is:

1. A lockable hub for use between a driven shaft and a wheel revolvable thereon, comprising:
    a sleeve coupled to said shaft end and having an outstanding annular flange on its outer end;
    a hub housing secured at the axis of the wheel and being journalled on said sleeve inward of said sleeve flange, said housing having an internal flange closely encircling said sleeve flange;
    a collar and said housing extending longitudinally outward beyond said internal housing flange;
    there being formed in said sleeve flange and the housing flange a plurality of opposed matching grooves; and
    a push-pull member longitudinally slideable in said collar extension and carrying a plurality of instanding dowel members insertable in said opposed matching grooves whereby to lock together said hub housing and said sleeve;
    said push-pull member having a separate socket to receive each of said respective dowel members and having an annular groove intersecting said sockets, said dowel members each having a notch registrable with said intersecting groove, and a resilient ring positioned in said intersecting groove and the registered notches of said dowel members.

2. A lockable hub for use between a driven shaft and a wheel revolvable thereon, comprising:
    a sleeve coupled to said shaft end;
    a hub housing secured at the axis of the wheel and having an internal surface closely encircling and journaled on said sleeve inward of said sleeve end;
    a collar extension on said housing extending outward beyond said sleeve;
    there being formed in said sleeve and the sleeve-encircling internal surface of said housing a plurality of opposed matching grooves; and
    a push-pull member longitudinally slideable in said collar extension and carrying a plurality of instanding dowel members insertable in said opposed matching grooves whereby to lock together said hub housing and said sleeve;
    said push-pull member having a separate socket to receive each of said respective dowel members and having an annular groove intersecting said sockets, said dowel members each having a notch registrable with said intersecting groove, and a resilient ring positioned in said intersecting groove and the registered notches of said dowel members.

3. A lockable hub for use between a driven shaft and a wheel revolvable thereon, comprising:
    a hub journaled about the shaft at the axis of the wheel enclosing the end of said driven shaft;
    said hub having internally thereon and said shaft having externally thereon an annular series of opposed matching grooves concentrically positioned parallel to the shaft axis; and
    a push-pull member longitudinally slideable in said hub and carrying a plurality of instanding dowel members insertable in said matching grooves to lock together said hub housing and said sleeve;
    said push-pull member having a separate socket to receive each of said respective dowel members and having an annular groove intersecting said sockets, said dowel members each having a notch registrable with said intersecting groove, and a resilient ring positioned in said intersecting groove and the registered notches of said dowel members.

References Cited
UNITED STATES PATENTS

| | | | |
|---|---|---|---|
| 1,199,452 | 9/1916 | Coffey | 192—67 X |
| 1,646,646 | 10/1927 | Gaylord | 192—67 |
| 2,812,840 | 11/1957 | Winter et al. | 192—67 |
| 2,948,557 | 8/1960 | Howe et al. | 287—53 |
| 3,050,321 | 8/1962 | Howe et al. | 287—53 |

FOREIGN PATENTS

| | | |
|---|---|---|
| 437,343 | 7/1934 | Great Britain. |

CARL W. TOMLIN, *Primary Examiner.*

A. V. KUNDRAT, *Assistant Examiner.*